United States Patent
Sung et al.

(10) Patent No.: US 8,658,896 B2
(45) Date of Patent: Feb. 25, 2014

(54) TEMPERATURE MOVABLE STRUCTURE OF SUPERCONDUCTING CABLE TERMINAL

(75) Inventors: Heo Gyung Sung, Busan (KR); Su Kil Lee, Gumi-si (KR); Hyun Man Jang, Hwaseong-si (KR); Jung Min Lee, Ansan-si (KR); Chang Youl Choi, Gumi-si (KR); Seok Hern Jang, Gunpo-si (KR)

(73) Assignee: LS Cable Ltd., Anyang-Si, Gyeonggi-Do (KR)

( * ) Notice: Subject to any disclaimer, the term of this patent is extended or adjusted under 35 U.S.C. 154(b) by 478 days.

(21) Appl. No.: 13/005,645

(22) Filed: Jan. 13, 2011

(65) Prior Publication Data
US 2011/0174535 A1    Jul. 21, 2011

(30) Foreign Application Priority Data

Jan. 21, 2010  (KR) .................. 10-2010-0005648

(51) Int. Cl.
*H02G 15/34* (2006.01)
(52) U.S. Cl.
USPC .................. 174/84 R; 174/15.4; 174/15.5
(58) Field of Classification Search
USPC .............................. 174/84 R, 15.5
See application file for complete search history.

(56) References Cited

U.S. PATENT DOCUMENTS

| 6,888,060 | B2 * | 5/2005 | Ashibe et al. | 174/15.3 |
| 7,067,739 | B2 * | 6/2006 | Ashibe et al. | 174/84 R |
| 7,928,321 | B2 * | 4/2011 | Corsaro et al. | 174/125.1 |
| 2004/0256126 | A1 * | 12/2004 | Ashibe et al. | 174/15.5 |
| 2005/0217878 | A1 * | 10/2005 | Ashibe et al. | 174/15.5 |
| 2009/0197769 | A1 * | 8/2009 | Hirose | 505/163 |
| 2010/0199689 | A1 * | 8/2010 | Choi et al. | 62/51.1 |

* cited by examiner

*Primary Examiner* — William H Mayo, III
*Assistant Examiner* — Hiram E Gonzalez
(74) *Attorney, Agent, or Firm* — Lowe Hauptman & Ham, LLP

(57) ABSTRACT

Disclosed herein is a temperature movable structure of a superconducting cable terminal. The superconducting cable terminal has sections of a high temperature portion, a temperature movable portion and an extremely low temperature portion. The temperature movable structure is disposed in the section of the temperature movable portion between the sections of the high temperature portion and the extremely low temperature portion. The temperature movable structure has upper and lower spacer members, a pipe body, first and third conductors, a second conductor and a contact connecting member disposed between the first and second conductors.

10 Claims, 4 Drawing Sheets

TEMPERATURE MOVABLE STRUCTURE OF SUPERCONDUCTING CABLE TERMINAL

CROSS-REFERENCE TO RELATED APPLICATION

This application claims priority to Korean Patent Application No. 10-2010-0005648, filed on Jan. 21, 2010, and all the benefits accruing therefrom under 35 U.S.C. §119, the contents of which in its entirety are herein incorporated by reference.

BACKGROUND

1. Field of the Invention

Disclosed herein is a temperature movable structure of a superconducting cable terminal. More particularly, disclosed herein is a temperature movable structure of a superconducting cable terminal, in which the assembling and insulating structures of a conductor installed in the temperature movable structure are improved as new ones, so that the assembling property, structural strength and insulation strength of the temperature movable structure can be enhanced, and the deformation of the conductor due to thermal contraction and expansion can be reduced.

2. Description of the Related Art

A general superconducting cable terminal has sections of a high temperature portion, a temperature movable portion and an extremely low temperature portion in the direction from its top to its bottom. A conductor bar is installed in each of the sections that respectively form the high temperature portion, the temperature movable portion and the extremely low temperature portion.

For insulation of the terminal, it is general that gaseous nitrogen is contained in the temperature movable portion, insulating oil or gas is contained in the high temperature portion, and liquid nitrogen is contained in the extremely low temperature portion.

The general superconducting cable terminal having the aforementioned configuration has a structure in which only a solid insulator of which insulation is broken down cannot be removed or separated from a conductor bar even when the insulation breakdown for the solid insulator occurs in the temperature movable portion with a high incidence of insulation accidents. Therefore, it is necessary that the solid insulator and the conductor bar should be separately manufactured as new ones and that the process of surrounding the solid insulator around the surface of the conductor bar should be performed again. Hence, it is not easy to maintain and repair the superconducting cable terminal. Accordingly, cost for maintenance and repair is increased.

Since a conductor bar used conventionally is formed into a structure in which its internal section is filled, its heat transfer area is wide. Therefore, the conductor bar is seriously deformed due to excessive heat transfer in thermal contraction or expansion. Accordingly, the solid insulator is broken, and therefore, insulation breakdown occurs.

SUMMARY OF THE INVENTION

Disclosed herein is a temperature movable structure of a superconducting cable terminal, in which the assembling and insulating structures of a conductor installed in the temperature movable structure are improved as new ones.

In an aspect, there is provided a temperature movable structure of a superconducting cable terminal having sections of a high temperature portion, a temperature movable portion and an extremely low temperature portion, the temperature movable structure being disposed in the section of the temperature movable portion between the sections of the high temperature portion and the extremely low temperature portion, the temperature movable structure including: upper and lower spacer members respectively connected to top and bottom of the temperature movable structure to close the interior of the temperature movable structure; a pipe body disposed between the upper and lower spacer members, the pipe body being connected to the upper and lower spacer members; first and third conductors disposed to pass through the center of the pipe body, the first and third conductors being respectively fixed to conductive connectors of the upper and lower spacer members; a second conductor disposed between the first and third conductors, the second conductor being connected and fixed to an upper surface of the third conductor; and a contact connecting member disposed between the first and second conductors so that the first and second conductors are joined with the contact connecting member while being respectively inserted into the contact connecting member in upper and lower directions of the contact connecting member.

The first conductor may have a projection with predetermined length, protruded from a bottom surface of the first conductor, so that the projection is inserted into the contact connecting member.

A groove portion with a predetermined depth, a lower portion of which is opened, may be formed in the interior of the second conductor, and a projection with a predetermined length, protruded to be inserted into the contact connecting member, may be formed on a top surface of the second conductor.

The contact connecting member may have a circular structure in which a plurality of bar-shaped conductive segments are arranged along the inner circumference thereof. Upper and lower connecting grooves may be formed in the interior of the contact connecting member so that the projection of the first conductor and the projection of the second conductor are inserted thereinto, respectively. One or more elastic members may be joined with the contact connecting member while surrounding the circumference of the contact connecting member so as to maintain the arrangement of the conductive segments and to apply a pressing force to the conductive segments.

A shield member for surrounding the range from the projection of the first conductor to the second conductor may be disposed between the first, second and third conductors and the pipe body, and upper and lower ends of the shield member may be fixed to corresponding surfaces of the first and third conductors, respectively.

The shield member may include upper and lower shield portions separated from each other, and a gap may be disposed between the upper and lower shield portions.

The caliber of the shield member may be gradually narrowed from the center to both ends of the shield member.

BRIEF DESCRIPTION OF THE DRAWINGS

The above and other aspects, features and advantages of the present invention will become apparent from the following description of preferred embodiments given in conjunction with the accompanying drawings, in which.

DETAILED DESCRIPTION OF THE INVENTION

Figure 1:
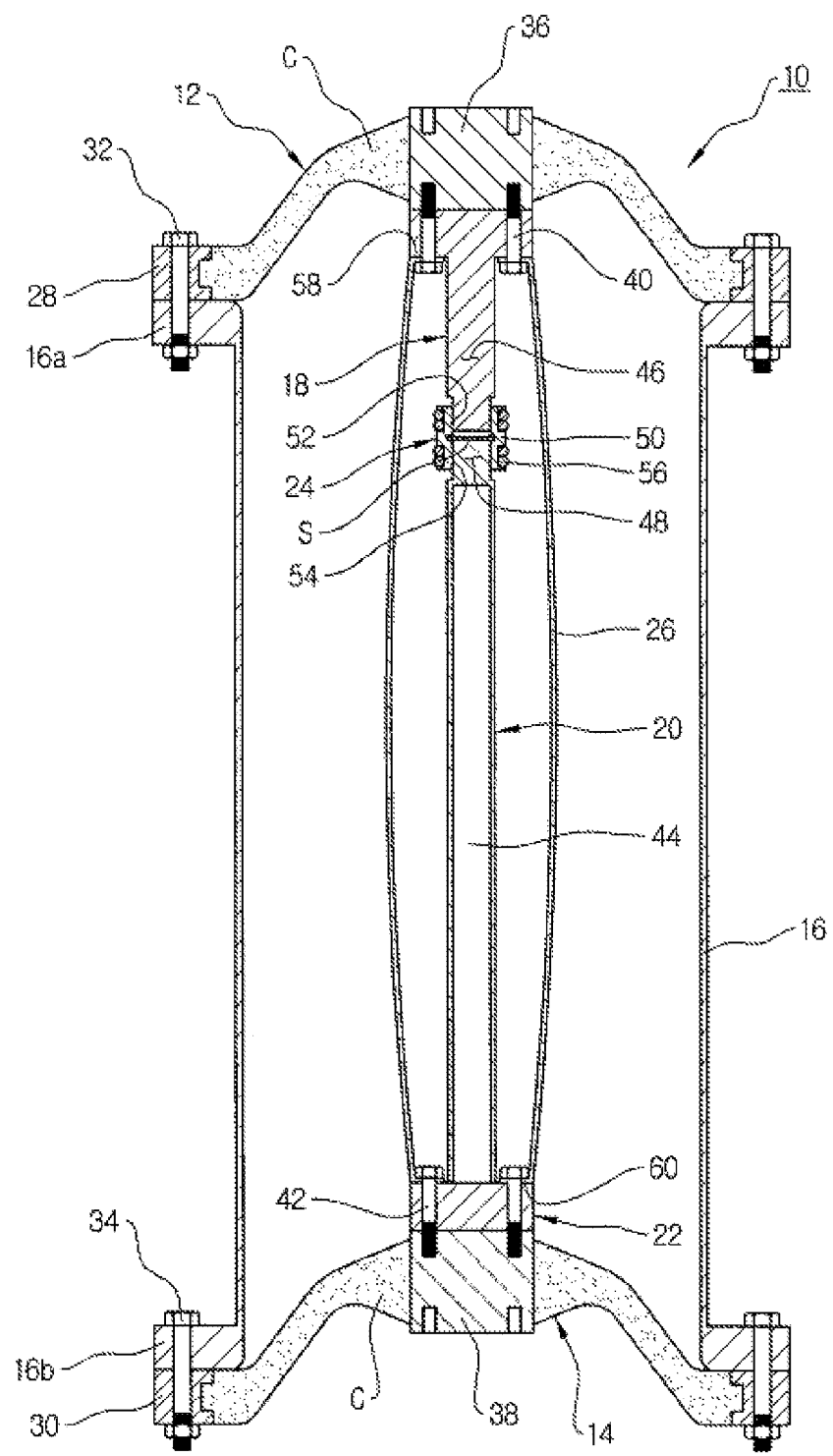
FIG. 1 is a sectional view showing a temperature movable structure of a superconducting cable terminal according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 2:
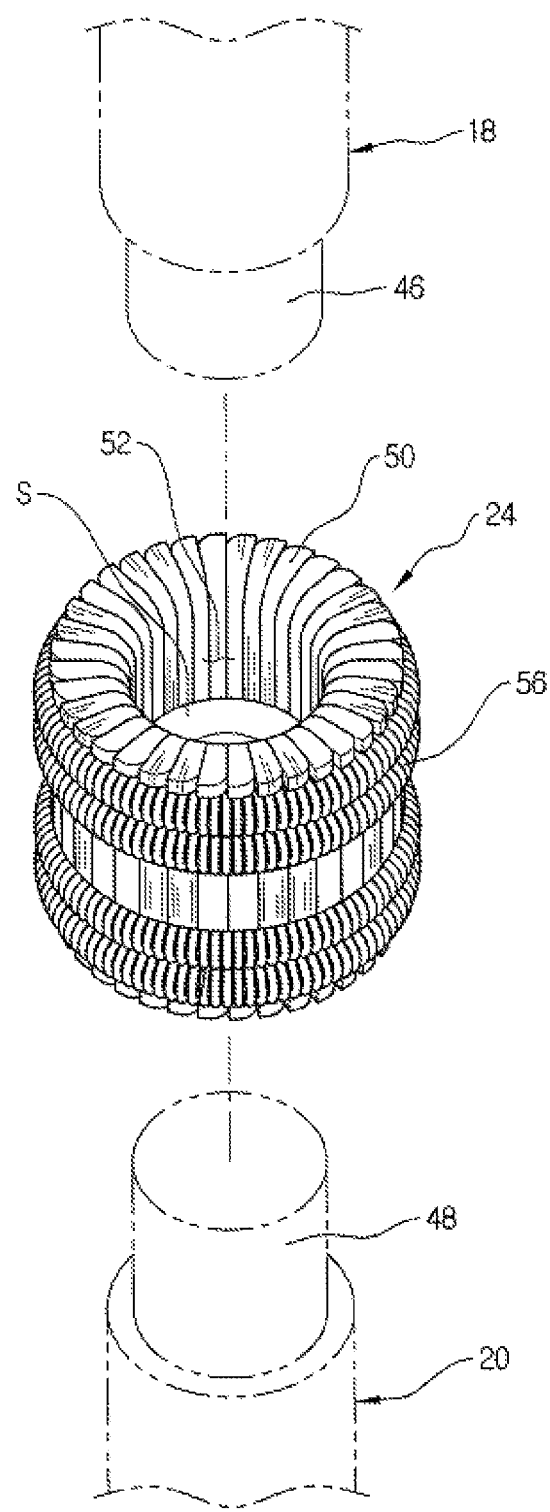
FIG. 2 is a perspective view showing a contact connecting member of FIG. 1.

FIG. 1 is a sectional view showing a temperature movable structure of a superconducting cable terminal according to an embodiment. FIG. 2 is a perspective view showing a contact connecting member of FIG. 1. Before describing these figures in detail, a general superconducting cable terminal has sections of a high temperature portion, a temperature movable portion and an extremely low temperature portion in the direction from its top to its bottom. In this embodiment, a temperature movable structure disposed in the section of the temperature movable portion will be described.

As shown in these figures, upper and lower spacer members 12 and 14, which will be described later, are disposed and connected to top and bottom of the temperature movable structure 10 of the superconducting cable terminal, respectively.

The upper and lower spacer members 12 and 14 function to connect and shield a structure disposed at each of the sections, to prevent insulation breakdown due to discharge and to secure an insulation distance.

The temperature movable structure 10 includes a pipe body 16 disposed between the upper and lower spacer members 12 and 14; first, second and third conductors 18, 20 and 22 installed to pass through the pipe body 16; a contact connecting member 24 for connecting the first and second conductors 18 and 20 to each other; and a shield member 26 disposed to surround the circumferences of the first and second conductors 18 and 20.

The temperature movable structure 10 according to this embodiment has a structure in which the first conductor 18, the second conductor 20, the third conductor 22, the shield member 26 and the contact connecting member 24 are easily assembled or disassembled. Accordingly, component replacement can be partially accomplished.

Specifically, fastening portions 28 and 30 formed at the upper and lower spacer members 12 and 14 are joined with flanges 16a and 16b of the pipe body 16 through fastening members 32 and 34, respectively. The spacer portions C of the upper and lower spacer members 12 and 14 are formed of an insulating material, and the fastening portions 28 and 30 are formed of a metal.

Conductive connectors 36 and 38 are respectively formed in the centers of the upper and lower spacer members 12 and 14 in the state that top and their bottom surfaces are exposed. The first conductor 18 is fastened and fixed to the conductive connector 36 of the upper spacer member 12 through a fastening member 40 in the state that a surface of the first conductor 18 is tightly adhered to the corresponding surface of the conductive connector 36. The third conductor 22 is fastened and fixed to the conductive connector 38 of the lower spacer member 14 through a fastening member 42 in the state that a surface of the third conductor 22 is tightly adhered to the corresponding surface of the conductive connector 38.

The second conductor 20 is connected to an upper surface of the third conductor 22 by welding. However, this embodiment is not limited thereto, but the second and third conductors 20 and 22 may be integrally formed with each other.

A groove portion 44 with a predetermined depth, a lower portion of which is opened, is formed in the interior of the second conductor 20. If the groove portion 44 is formed in the interior of the second conductor 20 as described above, the heat transfer area of the second conductor 20 is decreased, and accordingly, heat transfer is reduced. Accordingly, the deformation of the second conductor 20 due to thermal contraction or expansion can be minimized.

Meanwhile, the contact connecting member 24 is disposed between the first and second conductor 18 and 20. Projections 46 and 48 are joined with the contact connecting member 24 while respectively entering in the upper and lower directions of the contact connecting member 24 to be inserted into the interior of the contact connecting member 24. Here, the projection 46 is protruded downward from the bottom of the first conductor 18, and the projection 48 is protruded upward from the top of the second conductor 18.

The first and second conductors 18 and 20 are configured as described above, and are forcibly inserted into the interior of the contact connecting member 24, so that the assembly and disassembly of the first and second conductors 18 and 20 can be easily performed. Thus, component replacement can be partially accomplished, and maintenance and repair can be conveniently accomplished.

As shown in FIG. 2, the contact connecting member 24 has a circular structure in which a plurality of bar-shaped conductive segments 50 are arranged along the inner circumference thereof. Upper and lower connecting grooves 52 and 54 are formed in the interior of the contact connecting member 24 so that the projection 46 of the first conductor 18 and the projection 48 of the second conductor 20 are inserted thereinto, respectively. A disk S that serves as a guide is disposed at a boundary portion between the upper and lower connecting grooves 52 and 54 so that the structure of the conductive segments 50 can be maintained.

One or more elastic members 56 formed of a circular spring are joined with the contact connecting member 24 while surrounding the circumference of the contact connecting member 24 so as to apply a pressing force to the conductive segments 50.

Thus, although each of the projections 46 and 48 joined with the contact connecting member 24 is deformed, contact failure is prevented by the pressing force applied to the conductive segments 50 by the elastic members 56.

Furthermore, when the projections 46 and 48 are deformed by thermal contraction and expansion, the elastic members 56 that surround the conductive segments 50 is relaxed and contracted according to the thermal contraction and expansion, and the caliber of the contact connecting member 24, i.e., the shape of the upper and lower connecting grooves 52 and 54 is variably adjusted, so that contact failure does not occur between the contact connecting member 24 and each of the projections 46 and 48.

According to this embodiment, the shield member 26 for surrounding the range from the projection 46 of the first conductor 18 to the second conductor 20 is disposed between the first, second and third conductors 18, 20 and 22 and the pipe body 16. The shield member 26 is formed into a circular hollow structure in which the caliber of the shield member 26 is gradually narrowed from the center to both ends of the shield member 26 so that foreign matters produced from the contact connecting member 24 can be accumulated in the interior of the shield member 24.

Upper and lower flanges 58 and 60 of the shield member 26 are fixed by the fastening members 40 and 42 for fixing the first and third conductors 18 and 22 to the upper and lower spacer members 12 and 14 in the state that the upper and lower flanges 58 and 60 are tightly adhered to the corresponding surfaces of the first and third conductors 18 and 22, respectively.

In FIG. 1, the shield member 26 is formed in a single body, but it is unnecessary that the shield member 26 is necessarily formed in a single body.

Figure 3:
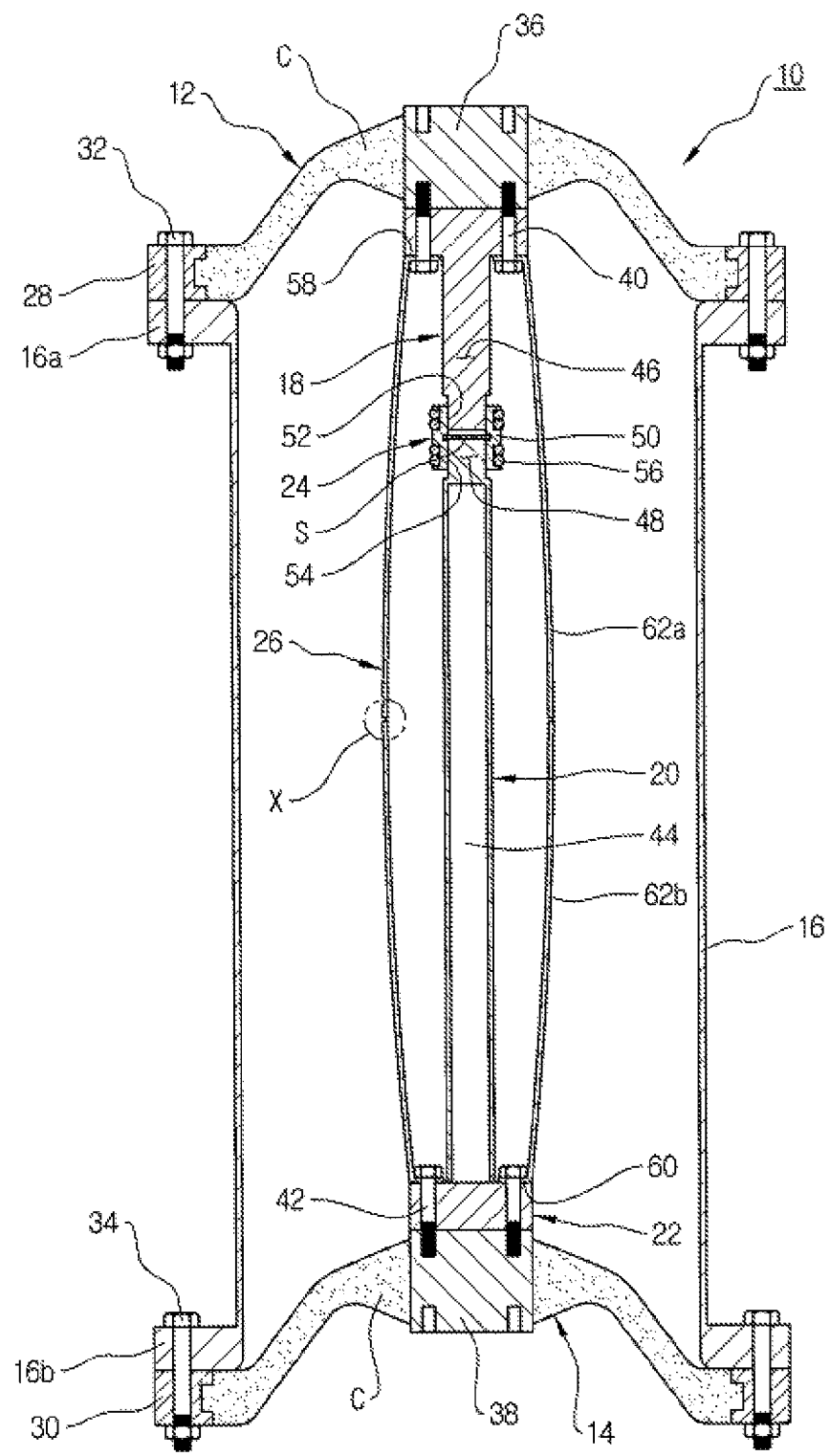
FIG. 3 is a sectional view showing a temperature movable structure of a superconducting cable terminal, in which another type of shield member is installed according to another embodiment.
Figure 4:
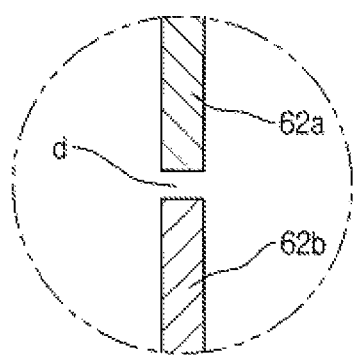
FIG. 4 is an enlarged view of portion X of FIG. 3.

As shown in FIGS. 3 and 4, according to another embodiment, the shield member 26 is manufactured to be divided into an upper shield portion 62a and a lower shield portion 62b. The shield member 26 is installed in the temperature movable structure 10 so that a gap is formed between the upper and lower shield portions 62a and 62b.

If the shield member 26 is manufactured to have the upper and second shield portions 62a and 62b as described above, it is possible to prevent the shield member 26 from being broken when the shield member 26 is installed in or separated from the interior of the temperature movable structure 10. Also, the weight of the shield member 26 is light, and thus, the temperature movable structure 10 can be easily carried. Also, the shield member 26 can be partially replaced when deformation of the shield member 26 due to thermal contraction and expansion occurs, and thus, maintenance and repair can be easily accomplished.

As described above, according to a temperature movable structure of a superconducting cable terminal, disclosed herein, although first and second conductors are thermally contracted and expanded, the incidence of accidents due to insulation breakdown is low. Further, it is unnecessary to replace a solid insulator and a conductor bar by new ones, thereby reducing cost for maintenance and repair.

Also, the assembling property, structural strength and insulation strength of the temperature movable structure can be enhanced by applying the intermediate function of a contact connecting member, the connection structure in which the first, second and third conductors are easily assembled and disassembled, and a new insulating structure using a shield member.

Also, the heat transfer area of the second conductor is decreased due to a groove portion formed in the second conductor, thereby minimizing its deformation caused by thermal contraction and expansion.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A temperature movable structure of a superconducting cable terminal comprising:
   an upper spacer member and a lower spacer member respectively connected to top and bottom of the temperature movable structure to close the interior of the temperature movable structure;
   a pipe body disposed between the upper spacer member and the lower spacer member, the pipe body being connected to the upper spacer member and the lower spacer member;
   a first conductor and a third conductor disposed to pass through the center of the pipe body, the first conductor and the third conductor being respectively fixed to conductive connectors of the upper spacer member and the lower spacer member;
   a second conductor disposed between the first conductor and the third conductor, the second conductor being connected and fixed to an upper surface of the third conductor; and
   a contact connecting member disposed between the first conductor and the second conductor so that the first conductor and the second conductor are joined with the contact connecting member while being respectively inserted into the contact connecting member in upper and lower directions of the contact connecting member,
   wherein the temperature movable structure is disposed in a section of a temperature movable portion between a section of a high temperature portion and a section of an extremely low temperature portion included in the superconducting cable terminal.

2. The temperature movable structure according to claim 1, wherein the first conductor has a projection with predetermined length, protruded from a bottom surface of the first conductor, so that the projection is inserted into the contact connecting member.

3. The temperature movable structure according to claim 2, wherein a groove portion with a predetermined depth, a lower portion of which is opened, is formed in the interior of the second conductor, and a projection with a predetermined length, protruded to be inserted into the contact connecting member, is formed on a top surface of the second conductor.

4. The temperature movable structure according to claim 3, wherein:

the contact connecting member has a circular structure in which a plurality of bar-shaped conductive segments are arranged along the inner circumference thereof;

upper and lower connecting grooves are formed in the interior of the contact connecting member so that the projection of the first conductor and the projection of the second conductor are inserted thereinto, respectively; and one or more elastic members are joined with the contact connecting member while surrounding the circumference of the contact connecting member so as to maintain the arrangement of the conductive segments and to apply a pressing force to the conductive segments.

5. The temperature movable structure according to claim 4, wherein a shield member for surrounding the range from the projection of the first conductor to the second conductor is disposed between the first, second and third conductors and the pipe body, and upper and lower ends of the shield member are fixed to corresponding surfaces of the first and third conductors, respectively.

6. The temperature movable structure according to claim 5, wherein the shield member comprises upper and lower shield portions separated from each other.

7. The temperature movable structure according to claim 6, wherein a gap is disposed between the upper and lower shield portions.

8. The temperature movable structure according to claim 5, wherein the caliber of the shield member is gradually narrowed from the center to both ends of the shield member.

9. The temperature movable structure according to claim 6, wherein the caliber of the shield member is gradually narrowed from the center to both ends of the shield member.

10. The temperature movable structure according to claim 7, wherein the caliber of the shield member is gradually narrowed from the center to both ends of the shield member.

* * * * *